Dec. 29, 1970    C. KÜHNE    3,551,905
DEVICE FOR INDICATING ASTRONOMICAL COORDINATES
OF ASTRONOMICAL INSTRUMENTS
Filed June 13, 1968    5 Sheets-Sheet 1
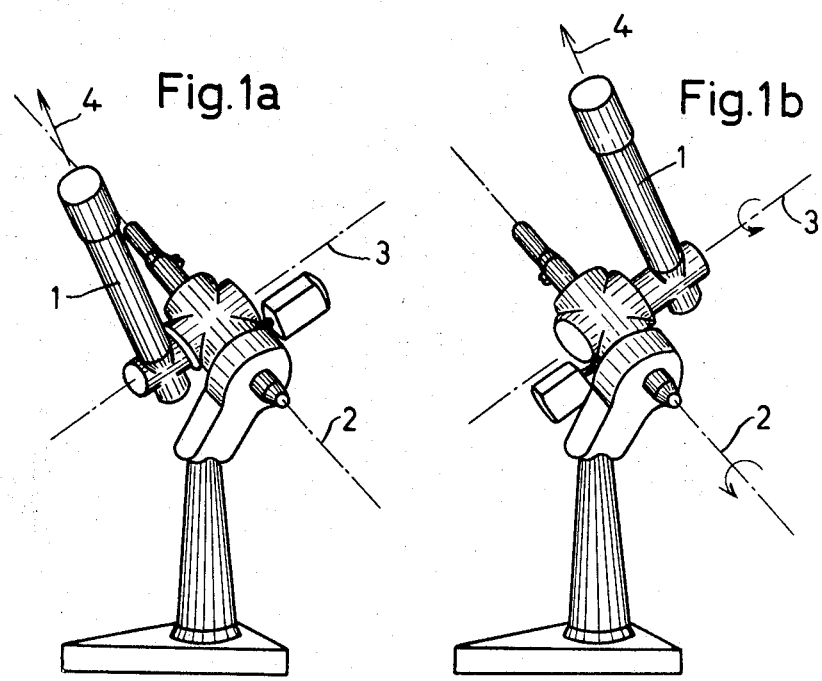
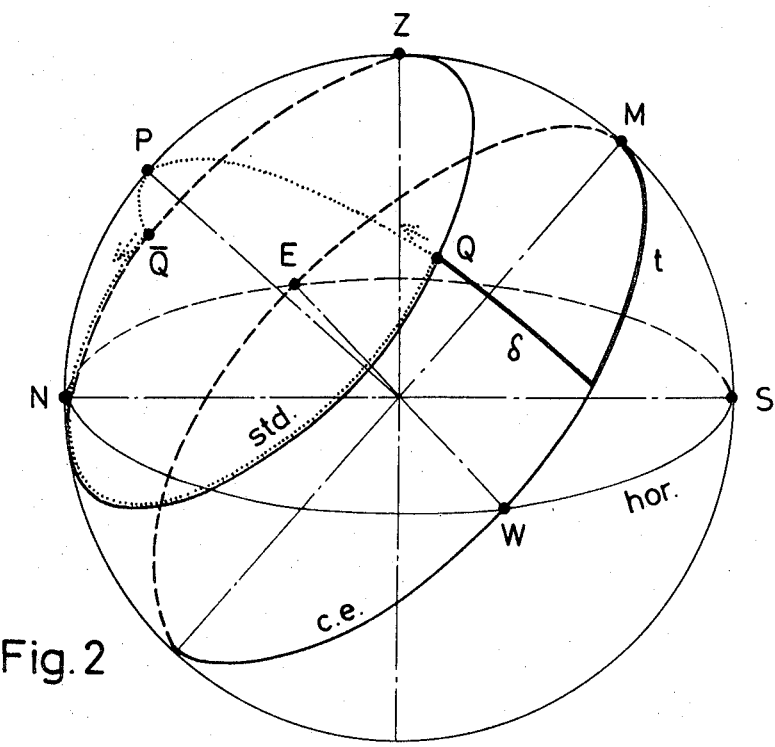

Dec. 29, 1970   C. KÜHNE   3,551,905
DEVICE FOR INDICATING ASTRONOMICAL COORDINATES
OF ASTRONOMICAL INSTRUMENTS
Filed June 13, 1968   5 Sheets-Sheet 5
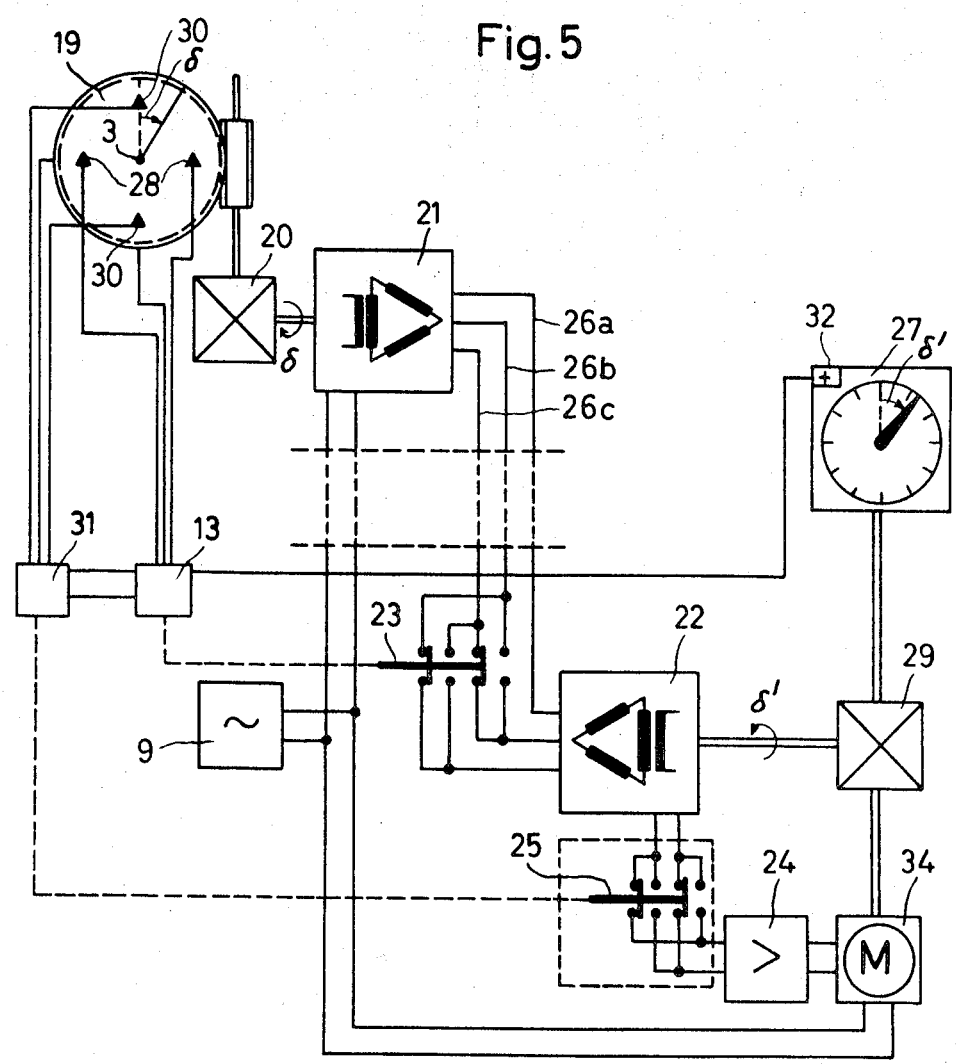

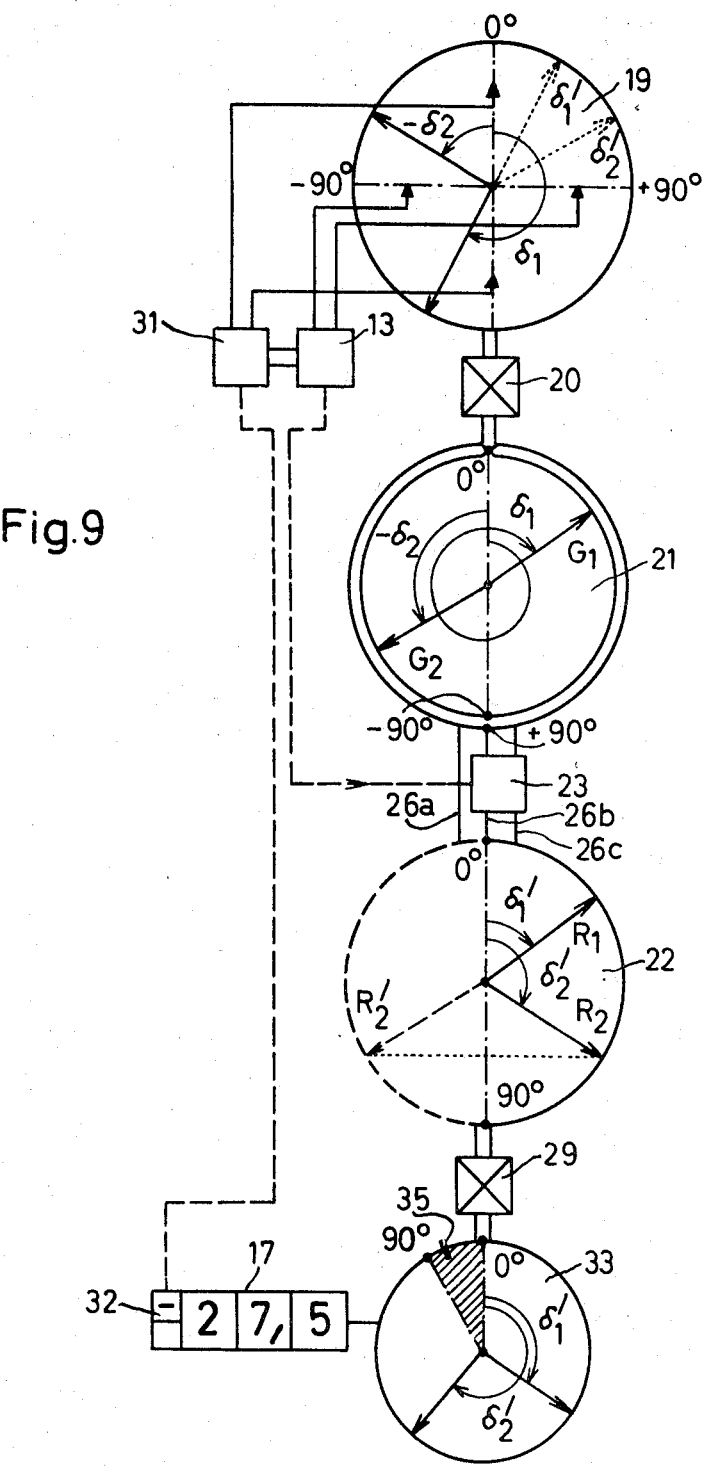

United States Patent Office 3,551,905
Patented Dec. 29, 1970

3,551,905
DEVICE FOR INDICATING ASTRONOMICAL COORDINATES OF ASTRONOMICAL INSTRUMENTS
Christoph Kühne, Heidenheim, Germany, assignor to Carl Zeiss-Stiftung, doing business as Carl Zeiss, Heidenheim (Brenz), Wurttemberg, Germany, a corporation of Germany
Filed June 13, 1968, Ser. No. 736,693
Claims priority, application Germany, June 14, 1967, Z 12,891
Int. Cl. G08c 19/42, 21/00
U.S. Cl. 340—198                                      10 Claims

ABSTRACT OF THE DISCLOSURE

A device for indicating angular coordinates in an astronomical instrument which is rotatable about a polar axis and a declination axis has transmitter synchros connected to be operated by rotation of the instrument about the axis for generating voltages which are transmitted respectively to receiver synchros for producing voltages in the rotors of the latter. Voltages from the rotors of the receiver synchros are applied through servomotors to operate indicating devices. The rotors of the transmitter synchros are also connected to the respective servomotors. Commutators are in the electric circuits from either the rotors of the receiving synchros or the rotors of the transmitting synchro to the respective servomotors. The commutators are operable to reverse the direction of polarity of voltages in the respective circuits and are operated through a relay and contacts which are arranged to operate the commutators when the instrument is rotated over the poles and/or across the celestial equator.

---

The present invention is a device for indicating the equatorial astronomical coordinates of astronomical instruments which have the same coordinates in the principal and in the reversed position. In particular the invention provides such a device which is of simple design and which avoids the occurrence of ambiguous readings in the reversed position.

There are many types of mounts for astronomical instruments with which are observation in one direction may be made in two different positions of the instrument. The second position differs from the first in that the polar axis is rotated by 180° and the declination axis is rotated by the same angle beyond its pole position that the direction of observation formed with the polar axis in the first position. Hereinafter one position is referred to as the principal position, the other as the reversed position.

Reversal of the astronomical instruments is provided in order to facilitate the accessiblity of view finder arrangements or apparatus, for example. With column mountings for long refractor telescopes which project far towards both sides, the ability to reverse the instrument is necessary in order to avoid a collision of the telescope with the mounting when the point observed is in right ascension.

To facilitate the adjustment of the astronomical instrument to a desired direction for the observer, these instruments are equipped with indicating devices for reading the hour and declination of the direction of observation. In its most simple design this device consists of graduated circles and reading indices on the axes. With astronomical instruments having the same coordinates in a principal and in a reversed position, ambiguity of the adjustment may be allowed for by using two indices on the polar axis and a special kind of graduation of the declination circle, but the observer must make the correct correlation by selecting the appropriate index to read.

Large astronomical instruments are sometimes equipped with electronic indicating devices which include suitable transmitting devices on the axes of the instrument. Corresponding receiving devices on a control desk or control console away from the instrument reproduce the positions on the axes in readable form. An article by Kalweit in "Askania-Warte," 19th year, No. 59 of April 1962, describes an A.C.-supplied synchro transmission system between the instrument and the control desk. In this system transmitting synchros are associated with the axes of the instrument and are coupled respectively to other, receiving synchros at the control desk. Indication of the coordinates may be effected by means of a pointer and scale arrangement, or digitally with figures. In the latter case suitable analog-to-digital converters are connected to the receiving synchros.

In the foregoing electronic indicating devices, as in the simple scale arrangements first described, the readings are ambiguous when the instrument is in reversed position due to the limitations of the circuit means conventionally employed between the instrument, the transmitting device, and/or the receiving device. An article by Jensch in "JENAER Rundschau," June 1965, discloses a device wherein duplicate indicating scales are provided with different indices, respectively, on each scale and wherein the observed point is indicated on one or the other of the scales by electronic control of the illumination of the scales. With digital indication, ambiguity is avoided by addition or subtraction of fixed values and by complement forming, but electronic and electromechanical means required for this purpose are generally quite expensive.

An indicating device embodying the present invention includes two transmitter synchros respectively for transmitting the hour angle $t$ and the declination angle $\delta$ of the instrument respectively to two receiver synchros which are connected to indicating devices at a control desk. The A.C.-operated rotors of the transmitter synchros are mechanically coupled respectively to the polar and declination axes of the instrument, and the rotors of the receiver synchros are mechanically coupled respectively to the indicating devices. The rotors of the receiver synchros are coupled through two phase lines to servomotors which are connected to synchronize the positions of the rotors of the receiver synchros with respect to the indicating devices. The stator of each transmitter synchro is coupled to the stator of the receiver synchro associated therewith by a three phase line.

In accordance with the inventon a commutator is arranged in the two phase rotor line of either of the transmitter or the receiver synchros, which transmit hour angle information. Another commutator is arranged in two of the three lines of the three phase stator line between the transmitter and receiver synchros, which transmit declination angle information, for selectively reversing the polarity of the two lines. With the declination axis of the instruments are connected contacts which are arranged to actuate the commutators in accordance with the movement of the declination axis relative to pole and equator positions and operate to actuate these commutators when the declination axis passes over the pole and equator positions. For example, if the astronomical instrument has the equatorial coordinates $t$ (hour angle) and $\delta$ (declination angle) in the principal position, the indicating device will indicate the coordinates $t'$ and $\delta'$. When the instrument is moved to the reversed position, it will point towards the old position, but the angular positions of the polar and declination axes are changed from $t$ to $t+12^h$ and from $\delta$ to $180° - \delta$. As the instrument moves from the principal position to the reversed position, the pole will necessarily be passed over, and the two commutators will be actuated to cancel out the resulting changes in the angular positions of the transmitter synchros. Thus the indications $t'$ and $\delta'$ on the indicating device are correct in either instance so that the observer can always read the correct coordinates of the instrument directly on the indicating device.

The device of this invention is more fully described hereafter with reference to the accompanying drawings in which:

FIG. 1a illustrates an astronomical instrument in its principal position;

FIG. 1b illustrates the same astronomical instrument in reversed position;

FIG. 2 is a representation of the hemisphere;

FIG. 5 is a schematic diagram of the arrangement of elements for indicating the declination angle in a device of this invention;

Figure 8:
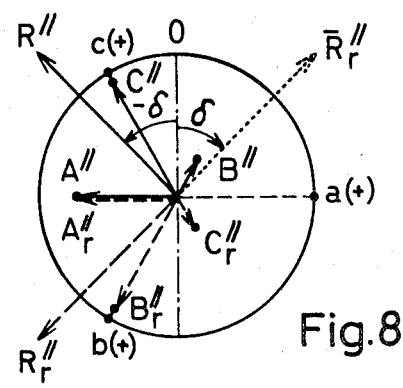

FIG. 8 is a vector diagram of the magnetic field of receiver synchro of the declination angle transmission arrangement when the instrument is in a position with negative declination; and FIG. 9 is a diagram of the essential arrangement elements of a declination angle transmission arrangement in which the gears provide a transmission ratio of 1:2 between the rotation of the declination axis of the instrument and the rotor of the transmitter synchro.

FIGS. 1a and 1b show an astronomical instrument which includes a refractor telescope 1 having a polar axis 2 and a declination axis 3. The arrow 4 indicates the direction of observation of the telescope 1.

The field of observation of telescope 1 is illustrated by the hemisphere shown in FIG. 2. Telescope 1 is considered as located at the center. On this hemisphere "hor" designates the horizon circle having the four horizontal directions E-S-W-N (east-south-west-north), and the celestial equator is referenced "c.e." Also marked is the meridian extending from the south point S via the zenith Z and the celestial pole P to the north point N. The position of a star Q, which describes the hour circle "std" during the course of the day, is defined by the equatorial coordinates $t$ and $\delta$. The hour angle $t$ is counted from the point M on the equator c.e. at which the meridian intersects the equator c.e. and is counted positively in the direction of the movement of the day in sidereal time from 0 to 24 hours. The declination angle $\delta$ is counted in degrees from the equator positively (0 to +90°) in the direction of the northern celestial pole P and negatively (0 to —90°) in the direction of the southern celestial pole (not shown).

If the telescope 1 in its principal position points to the star Q, then the values of $t$ and $\delta$ which correspond with the true coordinates of the star Q should be indicated on appropriate indicating devices.

If the telescope 1 is moved to the reversed position, illustrated in FIG. 1b, the direction of observation during the reversing action will follow the dotted curve shown in FIG. 2, moving first along the declination circle of the star Q from Q via P towards $\overline{Q}$ and from there back again to Q along the hour circle std. After completion of this movement the telescope 1 points in the original direction, so that the directions of observation, indicated by arrow 4 in FIGS. 1a and 1b, would be the same in each of the two positions. During this movement to the reversed position, however, the angular positions of rotors of transmitter synchros connected to the axes 2 and 3 move from $t$ to $t+12^h$ and from $\delta$ to $180°-\delta$. The device of this invention avoids reproducing on the indicating devices this ambiguity in defining the same angular positions of the rotors of the transmitting synchros in the principal and reversed positions of the instrument, and the means employed for this purpose are illustrated in the remaining FIGS. 3 to 9.

Figure 3:
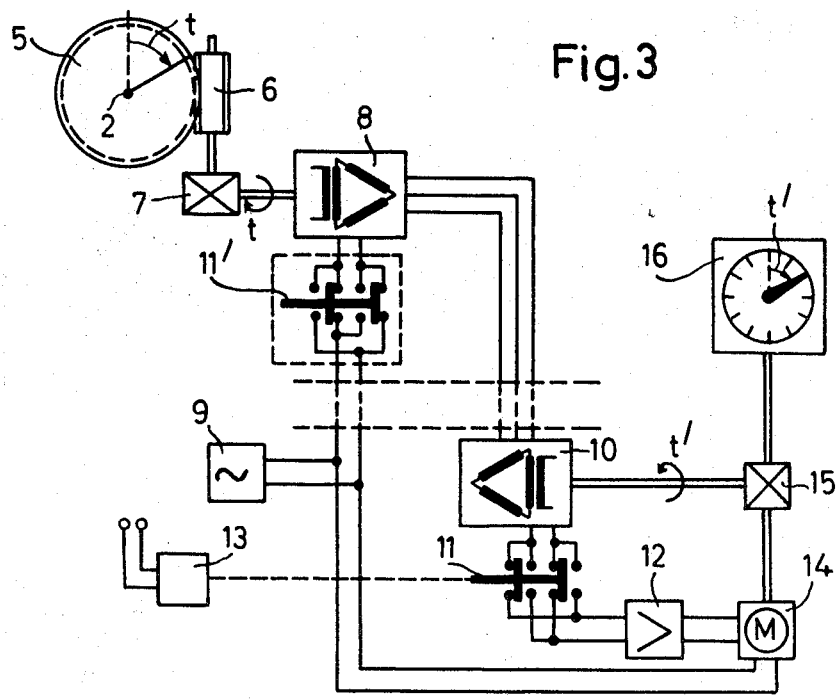
FIG. 3 is a schematic diagram of the arrangement of elements for indicating the hour angle in a device of this invention.

In FIG. 3 reference numeral 5 designates a worm gear mounted on the polar axis 2 of the instrument. Reference numeral 6 designates the driving worm, the shaft of which actuates a transmitter synchro 8 via the gear box 7, which has a transmission ratio of 1:1 relative to the axis 2. The transmitter synchro 8 is an A.C.-supplied synchro, the rotor of which is driven by the gear box 7, and the stator of which is provided with three three-phase windings displaced by 120° from each other and arranged in the delta connection. A low-frequency generator 9 is connected to supply A.C. voltage of, for example, 400 or 50 cycles to the rotor of the transmitter synchro 8. If a 50-cycle voltage system is used instead, the A.C. generator 9 may be replaced by a direct power supply line. The voltage generated by generator 9 represents the reference voltage for the whole electric system of the device in the conventional manner.

Reference numeral 10 designates a receiver synchro. The three-phase stator lines of the two associated synchros 8 and 10 are interconnected. The voltage generated by the rotor of the synchro 10 is supplied to an amplifier 12 via a commutator 11 which is actuated by a relay 13. A servomotor 14 connected to be operated by electric power from an amplifier 12 and from the generator 9 is mechanically connected through a gear box 15 to move the rotor of the receiver system 10 and, synchronously therewith, an indicating device 16. The indicating device 16 may be any suitable device for indicating hour angles; and an analog-to-digital converter may be used.

Figure 4A:
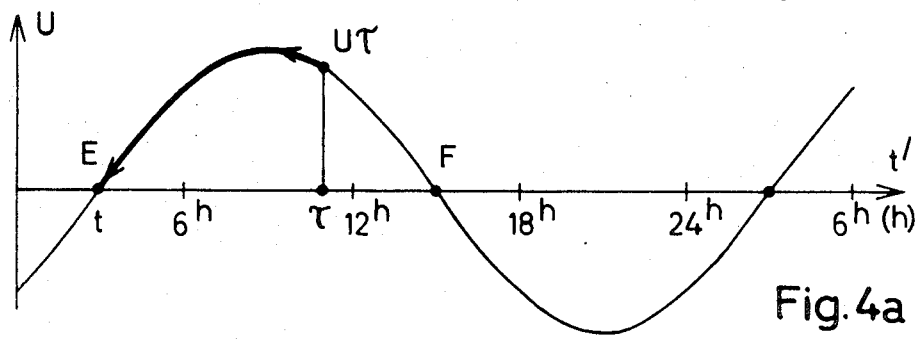
FIG. 4a is a graph of the voltage generated by the receiver synchro of the arrangement illustrated in FIG. 3 when the instrument is in its principal position.
Figure 4B:
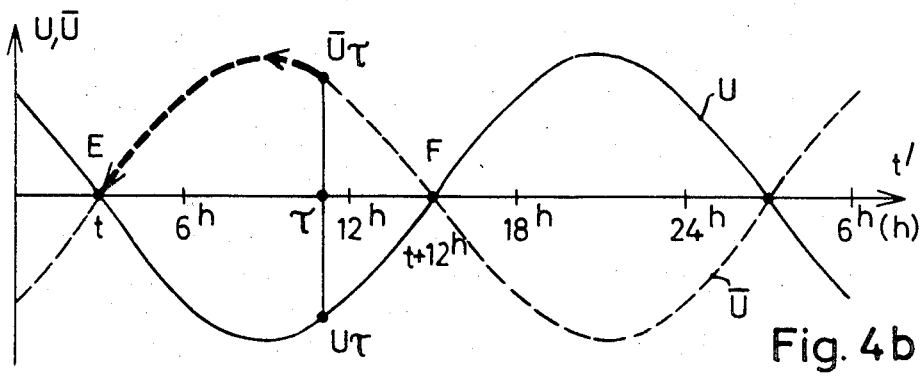
FIG. 4b is a graph of the voltage generated by the receiver synchro of the arrangement illustrated in FIG. 3 when the instrument is in reversed position.

In the operation of the apparatus illustrated in FIG. 3 the position occupied by the worm gear 5 is transmitted to the receiver synchro 10, via the three-phase lines, by the output signal of the transmitter synchro 8 which represents the hour angle $t$. FIG. 4a shows graphically the signal voltage U, which is induced in the rotor of the receiver synchro 10, as a function of the rotor position $t'$ of the receiver synchro 10. The relationship indicated assumes that the rotor position $t$ of the transmitter 8 is exactly $t=3^h$. If in a state not yet nulled the rotor of the receiver 10 is in the position $t'=\tau$, then U has the value $U_\tau$. This voltage, amplified by amplifier 12, is supplied to the servomotor 14, which, via the gear box 15, adjusts the rotor of the receiver synchro 10, the correct sign of the movement being ensured by connection of the servomotor 14 to the reference voltage of the generator 9. During this movement, the signal voltage U goes from $U_\tau$ along the thickened arc towards $U=0$ at point E, where finally $t'$ has become $t$, at which point the circuits to the servomotor 14 are in stable equilibrium. The second crossover referenced F is unstable, since $dU/dt'$ is negative.

If the instrument 1 is reversed, the transmitter synchro 8 changes its position by 180° ($12^h$). In the absence of special provisions, the signal voltage U would then follow the course of the curve as shown in solid lines in FIG. 4b, and the rotor of the receiver synchro 10 would assume the position F displaced by $12^h$. However, when reversing the instrument the commutator 11 is actuated via the relay 13 so that the polarity of the voltage U is reversed. This reversed polarity is indicated by the dashed line marked U in FIG. 4b. From position $t'=\tau$ the voltage receiver synchro 10 passes the crossover position E, at which equilibrium is stable, so that in the reversed position of the instrument 1 the indicating device 16 indicates the value $t'=t$.

FIG. 5 shows a circuit for the indication of the declination angle δ. This circuit is analogous to the circuit of FIG. 3, except that a commutator 23 is connected in two of the three stator lines in the three-phase line between a transmitter synchro 21 and a receiver synchro 22. Relay 13 actuates the commutator 23 and another commutator 25 is connected for selectively reversing the connections between the rotor line of receiver synchro 22 and amplifier 24.

Figure 6:
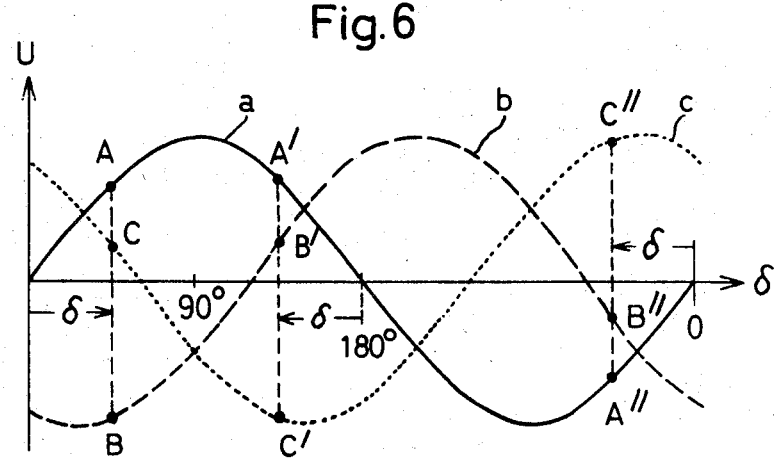
FIG. 6 is a graph of the voltages generated by the transmitter synchro of the arrangement illustrated in FIG. 5.

FIG. 6 shows the output voltages $U_a$, $U_b$ and $U_c$ of the transmitter synchro 21 which are compatible with a mechanical transmission ratio of 1:1 in the gear box 20 between the worm gear 19, which drives the declination axis 3, and the rotor of the transmitter synchro 21.

If the declination angle of the instrument 1 is in the principal position δ, the rotor of the transmitter synchro 21 holds the position relative to a zero position, which is defined by the condition wherein the voltage $U_a$ is zero and the derivative thereof $dU_a/d\delta$ is positive. The voltages in the stator lines 26a, 26b and 26c then correspond to the points A, B and C of FIG. 6. Each of these three voltages produces a partial magnetic field in the stator of the receiver synchro 22. The positive direction of these partial magnetic fields is referenced $a(+)$, $b(+)$ and $c(+)$ in FIGS. 7a and 7b. In the illustrated case, the amplitudes of the partial magnetic fields are represented by the end points A, B and C of the three arrows in FIG. 7a. They produce a resultant R, the direction of which forms the angle δ with the zero position. In the state of nulling of the circuit of the servomotor, the rotor of the receiver synchro 22 adjusts to this resultant position, which is also indicated on the indicating device 27. Thus, $\delta'=\delta$.

Figure 7A:
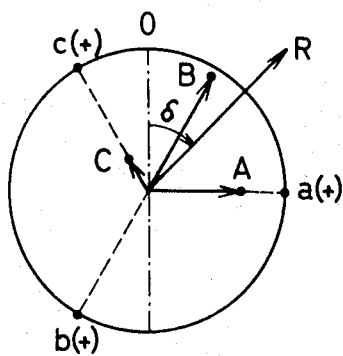
FIG. 7a is a vector diagram of the magnetic field of the receiver synchro of the declination angle transmission arrangement when the instrument is in its principal position.
Figure 7B:
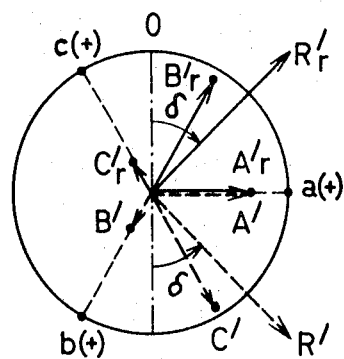
FIG. 7b is a vector diagram of the magnetic field of the receiver synchro of the declination angle transmission arrangement when the instrument is in its reversed position.

If the instrument 1 is moved to its reversed position, the voltages referenced A', B' and C' in FIG. 6 would ordinarily occur in the three stator lines of the transmitter synchro 21, and the corresponding partial magnetic fields in FIG. 7b would produce a resultant R' which forms the angle $180°-\delta$ with the direction of the zero position.

However, with the structure of the device of this invention, movement of the instrument to reversed position, produces the same hour and declination angle indications on the indicating devices 16 and 27 whether the instrument is in its principal or reversed position. This is accomplished by the commutator 11 (FIG. 3) and 23 (FIG. 5) which are controlled by the relay 13, which in turn is actuated by movement of the instrument to its reversed position.

As seen in FIG. 5, the relay 13 is actuated for operating the commutator 23 by rotation of the worm gear 19 (on declination axis 3) which connects the center line of a three-phase line from relay 13 to one or the other of two contacts 28 that are connected respectively to the other two lines of the three-phase line from relay 13. When the instrument is moved so that the declination axis 3 passes over the northern celestial pole, the connection is made through the right hand contact 28.

If, on the other hand, movement of the instrument carries the declination axis 3 over the southern celestial pole (as in an instrument mounted for swinging completely around the declination axis), the connection which actuates the relay 13 is made through the left hand contact 28.

When the relay 13 is thus actuated, the commutator 23 is thereby operated to interchange the voltages $U_b$ and $U_c$ in the three-phase line between synchros 21 and 22 (FIG. 5), which in turn changes the position of the partial magnetic fields in the stator of the receiver synchro 22. As illustrated in FIG. 7b, the partial magnetic fields B', C' move to $C'_r$, $B'_r$, (corresponding to a mirror image of B', C' with respect to $a(+)$. Consequently the resultant R' becomes $R'_r$, which is in the same direction as the resultant R (FIG. 7a). Thus, in the reversed position of the instrument, $\delta'=\delta$ and the position of the rotor of receiver synchro 22—as indicated by the indicating device 27—assumes the resultant R. Actuation of relay 13 also causes the commutator 11 to operate to interchange the polarity of the voltages in the two-phase line between the synchro 10, or synchro 8, and the servomotor 14 (FIG. 3) with the result that $t'=t$ (indicated on indicating device 16) in the reversed position of the instrument. Thus, the indication $t'$ on the indicating device 16 (FIG. 3), and the indication $\delta'$ on the indicating device 27 (FIG. 5), remain the same in both the principal and reversed positions of the instrument.

If the indication of the equatorial coodinates are desired to be in digital rather than analog form, analog-to-digital converters are connected to the gear boxes 15 (FIG. 3) and 29 (FIG. 5) Analog-to-digital converters for the conversion of the rotor movement of the receiver 22, are commonly cyclic as to their circumference of figures. This means that, after traversal of one circumference of figures, which is generally the case after one complete revolution of the driving shaft, rotation switches the indication to zero from its maximum numerical value, and a new cycle begins. However, the indication of the declination is not cyclic but changes from the northern to the southern hemisphere, so that its sign and direction changes.

For an instrument having a digital indicator, or in which the indicator can only reproduce the angular amount (without sign), a commutator 25 (FIG. 5) is provided, which is in addition to the commutator 23. Also provided are additional contacts 30 to be actuated when the equator is passed over, and a relay 31, which is in addition to the relay 13. When the equator positions are passed over, the relay 31 operates a sign signal 32 in the indicating device 27. In addition, the actuating elements of the commutators 11, 23 and 25 are intercoupled to operate in the manner described below, the quadrants being counted in a clockwise direction.

If the declination axis is:

in the first quadrant (principal position with positive declination, FIG. 7a), then all of the commutators 11, 23 and 25 will be in a position of rest;

in the second quadrant (reversed position with positive declination), the commutators 11 and 23 will be in operating position while commutator 25 remains in its position of rest;

in the third quadrant (reversed position with negative declination), the commutators 11 and 25 will be in operating position, while commutator 23 remains in its position of rest;

in the fourth quadrant (principal position with negative declination), the commutators 23 and 25 will be in operation position, while commutator 11 remains in its position of rest.

Now for a more detailed explanation of the foregoing operations, consider that the declination axis is in the fourth quadrant and assumes the angle $-\delta$, the absolute value of which corresponds with that of the angle δ of FIGS. 7a and 7b. In the absence of the structure and arrangement of this invention the voltages referenced A", B" and C" (FIG. 6) would be supplied by the transmitter synchro 21. The corresponding partial magnetic fields would, as indicated from FIG. 8, combine to a resultant R" which is also located in the fourth quadrant. Since the declination axis is in the fourth quadrant, both commutators 23 and 25 are operated, and the indicating device 27 indicates a negative sign as at 32 (FIG. 5).

As already described, the voltages $U_b$ and $U_c$ are interchanged by the commutator 23. Thus, referring to FIG. 8, the partial magnetic fields A", B", C" change into $A''_r$, $B''_r$ and $C''_r$, and the resultant R" changes to $R''_r$. The commutator 25 reverses the polarity of the rotor of the receiver synchro 23. Thus, the same conditions prevail as in FIG. 4b. The rotor of the receiver synchro does not adjust in the direction $R''_r$, but in the direction $\overline{R}'_r$ displaced by 180°. Thus, the indication 27 again renders the value $\delta' = \delta$ and the negative sign shows at 32.

In all four situations just described—that is, with the instrument in its principal and in its reversed positions, with positive and negative declinations—the resultant operative magnetic field of the receiver synchro is transformed into the first quadrant. That means that $0 \leq \delta' \leq 90°$, always, so that the amount of the resultant angle corresponds to the value of the astronomical definition of the declination. The position of the rotor of the declination receiver synchro 22 is always transformed into the first quadrant and remains therein during a complete rotation of the declination axis so that the receiver synchro is adapted to have an analog-to-digital converter, which is not cyclic with respect to the range to be indicated connected to it for reproducing unambiguous declination readings. If it is desired to resolve a declination indication down to 0.1°, an analog-to-digital converter of $$90 \times 10 = 900$$

units will be required and a commercial binary converter of $2^{10} = 1024$ bits may advantageously be used to achieve this. The input shaft of this type of converter is suitably geared, with respect to the drive shaft of the transmitter synchro 21 by the gear box 29 in a manner such that 900 bits exactly correspond to the first quadrant of $\delta'$. Since the circumference of the converter is not cyclic in 900 bits, the input shaft of the converter is prevented from transmitting readings outside the desired range by a mechanical stop which limits its angular range to a range corresponding to 900 bits.

The device of this invention may also be modified to double or quadruple the resolving power of the transmitter and receiver synchros by providing a gear box 20 (FIG. 5), which transmits rotations of the declination axis 3 to the transmitter synchro 21 in a 1:2 or a 1:4 ratio. With these transmission ratios the second commutator 25 (FIG. 5) is not necessary to enable a noncyclic analog-to-digital converter to be used, and may be omitted. With this arrangement the switching actions of the relays 13 and 31 are combined so that the commutator 23 (FIG. 5) will be actuated when the declination axis is in the second or fourth quadrant, and the commutator 11 (FIG. 3) will be actuated when the declination axis is in the second or third quadrant. Also, when the declination axis is in the third or fourth quadrant, a negative sign signal will be indicated at 32.

The operation of a device wherein the gear box 20 is adapted to rotate the rotor of transmitter synchro 21 twice for each rotation of the declination axis 3 will now be explained in greater detail with reference to the diagram in FIG. 9. This diagram illustrates the functional connections between the worm gear 19, the gear box 20, the declination transmitter 21, the commutator 23, the declination receiver 22, and an analog-to-digital converter 33 which translates the readings to figures indicated at 17. Since the gear box 20 has a transmission ratio of 1:2, the gear box 29 between the declination receiver synchro 22 and the analog-to-digital converter 33 has an input to output ratio such that rotation of the converter corresponding to a range of 90° is reproduced by half a rotation of the declination receiver 22. The range remaining from 90° to a complete cyclic circumference of the converter 33 is not utilized. A stop 35 is provided to prevent unintentional overtravel and a sign signal 32 is provided as explained with reference to FIG. 5.

When the declination axis, and thus the worm gear 19, forms the angle $\delta_1$, the declination axis is in the third quadrant, which means that the instrument is in reversed position with negative declination. Movement of the instrument back to the principal position with positive declination results in the angle $\delta'_1$, shown in dotted lines as at 19. During this movement the rotor of the declination transmitter synchro 21 rotates through the double angle via the gear 20 and assumes the position $G_1$.

As previously explained, when the declination axis 2 is in the third quadrant so that the commutator 11 (not shown) for the hour angle $t$ is actuated, the commutator 23 is in its position of rest and the negative sign is indicated at 32. Consequently, the rotor of the receiver synchro 22 assumes the position $R_1$ corresponding with the position $G_1$ of the transmitter synchro 21. As a result of the doubling gear ratio of gear box 20, the angle $\delta'_1$ from synchro 22 corresponds with the angle $\delta'_1$ from synchro 19. Thus, the correct amount of declination is indicated by the analog-to-digital converter 33 at 17 and the correct sign is indicated as at 32.

When the declination axis 3, and thus the worm gear 19, forms the angle $-\delta_2$ the declination axis is in the fourth quadrant, which corresponds to the principal position with negative declination. The value of the angle translated into a first quadrant value results in the angle $\delta'_2$, shown in dotted lines as at 19. The rotor of the declination transmitter synchro 21 has been rotated through the double angle with respect to the zero position and assumes the position $G_2$, and in the absence of corrective means in accordance with the invention, the rotor of the receiver synchro 22 would assume the position $R'_2$ corresponding with $G_2$. However, with the device of this invention, with the declination axis in the fourth quadrant, the commutator 23 is operated, the commutator 11 is in rest position, and a negative sign is signaled as at 32. The operation of commutator 23 reverses the connection through lines 26b and 26c so that the position of the rotor of synchro 22 corresponding to $G_2$ is translated to position $R_2$ rather than $R'_2$. In order for the translation of the declination axis to be positioned correctly, the direction of the partial magnetic field $a(+)$ which is not reversed, is arranged to be in the direction of the zero position, that is the zero position is selected to be at the point $\delta = 90°$, as seen in FIG. 6. Due to the doubling gear ratio of gear box 20, the angle $\delta'_2$ from synchro 22 corresponds with the angle $\delta'_2$ from synchro 19. Thus, the correct amount of declination is indicated as at 17 and the correct sign is indicated at 32.

If the gear box 20 has a transmission ratio of 1:4, the resolving power of the declination indication may be increased by another factor of 2, so that the transmitter synchro 21 and receiver synchro 22 execute one complete rotation for one quadrant of the declination axis. In other respects the arrangement just described with reference to FIG. 9—including the operation of the commutators 11 and 23 and the sign signal 32—remain the same.

In practice, as illustrated in FIGS. 3 and 5, the switching actions of the different commutators are advantageously arranged to take place on the instrument side of the device and not on the control desk side, because the latter arrangement would necessitate additional lines between the instrument and the control desk. With respect to the commutator 23 (FIG. 5), its function is properly performed whether it is connected directly behind the transmitter 21 or in front of the receiver 22. However, the commutator 11 for the hour angle and the commutator 25 for the declination angle (FIGS. 3 and 5 respectively) are connected behind the receiver synchros 10 and 25 and are therefore appropriately coupled to the control desk side of the device.

It will also be noted that angular measurements from the instrument will be correctly transmitted to the control desk if the polarity of the rotor line of the receiver synchros 10 and 22 or of the transmitter synchros 8 or 21 is reversed. It would therefore be possible, for example, to connect the commutator 11 of FIG. 3 into the rotor line of the transmitter synchro 8, as is indicated at 11'. The same applies to the commutator 25 of FIG. 5. It is thus possible to arrange the commutators on the instru-

What is claimed is:

1. A device for indicating angular coordinates in an astronomical instrument wherein the instrument is rotatable about two different axes for measuring the angular distance between a predetermined position and a point and wherein the coordinates of the point are the same in one position of the instrument as in the reverse position thereof, said device comprising a transmitter and a receiver synchro each having a rotor and a stator, said transmitter synchro having its rotor connected to be rotated by rotation of the instrument about one of said axes for generating a voltage in its stator, a first electric circuit for transmitting said voltage to the stator of the receiving synchro for generating a voltage in the rotor of the receiving synchro, means for indicating a coordinate of a point to which the instrument is directed, said means being operated by voltage from the rotor of the receiving synchro, a second electric circuit for transmitting voltage from the rotor of the receiving synchro to the indicating means, a third circuit for transmitting voltage from the rotor of the transmitter synchro to said indicating means, a commutator in one of said electric circuits operable to reverse the direction of polarity of voltage in this circuit, and means for actuating said commutator in response to rotation of the instrument past said predetermined position as the instrument is rotated to a reverse position whereby the voltage for operating the indicating means operates the latter to indicate the same measurement of the coordinate for the one and for the reverse positions of the instrument.

2. A device as in claim 1 in which the instrument is rotatable about a polar axis for measuring hour angles, and in which the commutator is in the electric circuit from the rotor of one of the transmitting synchro or receiving synchro to said indicating means.

3. A device as in claim 2 in which the commutator is in the electric circuit from the rotor of the receiving synchro to the indicating means.

4. A device as in claim 1 in which the instrument is rotatable about a declination axis for measuring declination angles and in which the commutator is in the electric circuit from the stator of the transmitting synchro and the stator of the receiving synchro.

5. A device as in claim 4 in which the commutator is in two of the three stator lines and in which a second commutator is arranged in the electric circuit from the rotor of the receiving synchro to the indicating means.

6. A device as in claim 4 which includes a sign indicating device operable to be moved between alternative positions for indicating plus and minus signs respectively, and which includes means for moving the sign indicating device from one position to the other in response to rotation of the instrument through the plane of a celestial equator from which the declination angle is measured.

7. A device as in claim 4 which includes means for actuating said second commutator in response to rotation of the instrument through the plane of a celestial equator from which the declination angle is measured.

8. A device as in claim 1 which includes an amplifier in the electric circuit from the rotor of the receiving synchro, and in which said means for indicating a coordinate comprises a servomotor connected to be operated by voltage from said amplifier, a mechanically operated indicating device for indicating a coordinate, and gear means mechanically connected between the servomotor and the rotor of the receiver synchro and the indicating device for operating the indicating device and rotating the latter rotor synchronously with the operation of the indicating device.

9. A device as in claim 8 in which: the instrument is rotatable about a declination axis for measuring declination angles; in which the indicating device is an analog-to-digital converter which is not cyclic with the circumference of figures of the range to be indicated; in which said commutator is in the electric circuit from the stator of the transmitting synchro; and which includes a second commutator in the electric circuit from the rotor of the receiver synchro means for actuating the second commutator in response to rotation of the instrument through the plane of a celestial equator from which the declination is measured, a sign indicating device operable to be moved between alternative positions for indicating plus and minus signs respectively, and means for moving the sign indicating device from one position to the other in response to rotation of the instrument through the plane of a celestial equator from which the declination angle is measured.

10. A device as claimed in claim 9 which includes second gear means connecting the rotor of the transmitter synchro to be rotated by rotation of the instrument about the declination axis, the first mentioned gear means associated with the servomotor, the second gear means and the indicating device being constructed to operate in proportion such that 90° of rotation of the instrument produces a range of 90° of digital indications on the indicating device.

References Cited
UNITED STATES PATENTS 3,293,548 12/1966 Hunt _____ 340—198X
3,355,641 11/1967 Eisengrein et al. _____ 318—24

STANLEY M. URYNOWICZ, JR., Primary Examiner

U.S. Cl. X.R.

318—24